(12) United States Patent
Nomura et al.

(10) Patent No.: US 9,506,499 B2
(45) Date of Patent: Nov. 29, 2016

(54) SLIDING MEMBER AND MANUFACTURING METHOD THEREFOR (71) Applicant: TAIHO KOGYO CO., LTD., Toyota-shi, Aichi (JP)

(72) Inventors: Satoshi Nomura, Toyota (JP); Hiroshi Kanemitsu, Toyota (JP); Masaharu Hatta, Toyota (JP); Takao Masamura, Toyota (JP)

(73) Assignee: Taiho Kogyo Co., Ltd. (JP)

( * ) Notice: Subject to any disclaimer, the term of this patent is extended or adjusted under 35 U.S.C. 154(b) by 94 days.

(21) Appl. No.: 14/367,697

(22) PCT Filed: Nov. 16, 2012

(86) PCT No.: PCT/JP2012/079741
§ 371 (c)(1),
(2) Date: Jun. 20, 2014

(87) PCT Pub. No.: WO2013/094351
PCT Pub. Date: Jun. 27, 2013

(65) Prior Publication Data
US 2015/0036955 A1 Feb. 5, 2015

(30) Foreign Application Priority Data

Dec. 22, 2011 (JP) .................................. 2011-281751

(51) Int. Cl.
*F16C 33/20* (2006.01)
*F04C 18/02* (2006.01)
*F16C 17/04* (2006.01)

(52) U.S. Cl.
CPC ............ *F16C 33/205* (2013.01); *F04C 18/02* (2013.01); *F16C 17/04* (2013.01); *F16C 33/208* (2013.01);

(Continued)

(58) Field of Classification Search
CPC ..... F16C 33/205; F16C 33/208; F16C 17/04
See application file for complete search history.

(56) References Cited

U.S. PATENT DOCUMENTS 3,565,498 A 2/1971 Leopard et al.
4,620,803 A * 11/1986 Vezirian .................. E21B 10/22
384/93

(Continued)

FOREIGN PATENT DOCUMENTS

CN 1735755 A 2/2006
EP 0249072 A2 12/1987

(Continued)

OTHER PUBLICATIONS

Search Report for International Application No. PCT/JP2012/079741 dated Feb. 19, 2013 (2 pages).

(Continued)

*Primary Examiner* — Thomas R. Hannon
(74) *Attorney, Agent, or Firm* — Harness, Dickey & Pierce, P.L.C.

(57) ABSTRACT

A thrust bearing is equipped with a resin coating applied to the surface of a base material. Lattice-shaped discharge grooves are formed in the surface of the thrust bearing, and planer protrusions having a square shape or the like are formed at the adjacent positions thereof. Each corner part of each planer protrusion form a sliding surface that slides with respect to a counterpart member. Contaminants such as wear particles that have infiltrated between the counterpart member and the sliding surface fail into the discharge grooves and then are discharged outside of the sliding surface. The chamfering of each corner part to a rounded shape prevents the contaminants from accumulating in the discharge grooves, thus preventing the contaminants from biting into the planer protrusions.

11 Claims, 5 Drawing Sheets

(52) U.S. Cl.
CPC ........ *F04C 18/0246* (2013.01); *F04C 2230/91* (2013.01); *F04C 2240/56* (2013.01); *F05C 2253/20* (2013.01); *F16C 2223/30* (2013.01); *F16C 2360/00* (2013.01)

(56) References Cited

U.S. PATENT DOCUMENTS

| | | | | |
|---|---|---|---|---|
| 4,772,188 | A | * | 9/1988 | Kimura ............... F04C 29/0021 384/123 |
| 4,789,250 | A | | 12/1988 | Schluter |
| 5,102,305 | A | * | 4/1992 | Bescoby .................. F01D 5/02 416/241 B |
| 5,333,955 | A | * | 8/1994 | Papa ........................ F16C 9/02 123/196 R |
| 5,714,818 | A | * | 2/1998 | Eakman .................. F16C 17/02 310/90.5 |
| 2003/0111511 | A1 | | 6/2003 | Kanayama et al. |
| 2004/0190804 | A1 | * | 9/2004 | John ....................... F16C 17/04 384/420 |
| 2006/0083451 | A1 | | 4/2006 | Kawagoe et al. |
| 2011/0052112 | A1 | * | 3/2011 | Yamane .................. C23C 22/22 384/420 |

FOREIGN PATENT DOCUMENTS

| | | |
|---|---|---|
| JP | 56-102830 U | 8/1981 |
| JP | 01-141926 U | 9/1989 |
| JP | 06-014538 U | 2/1994 |
| JP | 07-028219 U | 5/1995 |
| JP | 2001-173647 A | 6/2001 |
| JP | 3364016 B2 | 1/2003 |
| JP | 2005-155894 A | 6/2005 |
| JP | 2008-051045 A | 3/2008 |
| JP | 4511412 B2 | 7/2010 |
| JP | 4737141 B2 | 7/2011 |
| WO | WO-02-075172 M | 9/2002 |

OTHER PUBLICATIONS

Extended Search Report for European Patent Application No. 12859651.7 dated Jun. 9, 2015 (7 pages).

* cited by examiner

SLIDING MEMBER AND MANUFACTURING METHOD THEREFOR

CROSS-REFERENCE TO RELATED APPLICATIONS

This application is a U.S. National Stage Application of International Application No. PCT/JP2012/079741 filed on Nov. 16, 2012, and published in Japanese as WO 2013/094351 A1 on Jun. 27, 2013. This application claims priority to Japanese Application No. 2011-281751 filed on Dec. 22, 2011. The entire disclosures of the above applications are incorporated herein by reference.

TECHNICAL FIELD

The present invention relates to a sliding member and a manufacturing method therefor, and more specifically to a sliding member suitable for use as a thrust bearing of a scroll compressor, for example, and a manufacturing method therefor.

BACKGROUND ART

Conventionally, scroll compressors installed in motor vehicles are well-known, and proposals have been made for improving the thrust bearings of scroll compressors (see JP 4511412B, JP 4737141B, and JP 3364016B). Namely, in JP 4511412B, a plurality of annular grooves extending in a circumferential direction and a plurality of grooves extending in a radial direction are provided together on a sliding surface of the thrust bearing, and planar protrusions positioned adjacent thereto are constituted as a pressure receiving surface (see FIG. 5 of JP 4511412B).

Also, in JP 4737141B, in a thrust bearing consisting of a fixed-side thrust race and a movable-side thrust race as a pair, hard surface treatment such as DLC is performed on the sliding surface of the fixed-side thrust race, and a large number of circular protrusions are formed on the sliding surface of the movable-side thrust race (see FIG. 4 of JP 4737141B).

Furthermore, in JP 3364016B, a coating layer consisting of a solid lubricant is formed on the sliding surface of the thrust bearing (see FIG. 1 (C) of JP 3364016B). In JP 4511412B, JP 4737141B, and JP 3364016B, the abovementioned configurations are provided with the intension of improving the wear resistance and seizure resistance of thrust bearings.

SUMMARY

Problem to be Solved

Incidentally, there have recently been calls for improving the fuel efficiency of motor vehicles, and thus a reduction in power loss under poor lubrication conditions is also sought with respect to scroll compressors. In a scroll compressor, a thrust bearing is fixed to an intermediate housing that forms the fixed side, a thrust race is attached to an end face of a swirl vane that forms the movable side, and the thrust bearing and the thrust race on the swirl vane side slide with movement of the swirl vane. Scroll compressors are known to have a very slow peripheral speed when the swirl vane swings in tandem with the drive shaft. Thus, with scroll compressors, it is difficult to form an adequate film of oil between the thrust race on the swirl vane side and the sliding surface of the thrust bearing that slides on the thrust race when the swirl vane swings. Particularly in the case of low-pressure scroll compressors, there is a problem in that because the large compression force that acts on the swirl vane in the axial direction is supported by the sliding surface of the thrust bearing, an oil film does not readily form on the sliding part.

Friction between the thrust race and the thrust bearing thus increases in a state where an oil film does not readily form on the sliding surface of the thrust bearing, and engine power is lost. In view of this, in the abovementioned JP 4737141B and JP 3364016B, a resin coating is applied to the surface of the thrust bearing. However, wear particles from the resin are also produced in this case through friction, and may infiltrate between the sliding surfaces of the thrust race and the thrust bearing and dig into these surfaces. In this case, there is a problem in that formation of an oil film on the sliding surfaces of the thrust race and the thrust bearing is inhibited, and the gap between the end face of the swirl vane on the opposite side to the thrust race and the housing opposing the end face becomes clogged.

Solution

In view of the abovementioned situation, according to the first aspect of the present disclosure, there is provided a sliding member including a base material and a resin coating applied to a surface of the base material, in which a lattice-shaped discharge groove or a discharge groove of a shape having a corner part is formed on a surface of the sliding member, a plurality of planar protrusions are formed at positions adjacent to the discharge groove, surfaces of the plurality of planar protrusions are constituted as a sliding surface that slides with respect to a counterpart member, each corner part of the planar protrusions is chamfered to a rounded shape, and contaminants that infiltrate between the sliding surface and the counterpart member are discharged outside of the sliding surface by the discharge groove.

Also, according to the second aspect of the present disclosure, there is provided the sliding member according to the first aspect of the present disclosure, wherein the sliding member is a thrust bearing of a scroll compressor or a thrust race that slides with respect to the thrust bearing, and the discharge groove doubles as a lubricating oil channel through which lubricating oil circulates.

Also, according to the third aspect of the present disclosure, there is provided the sliding member according to the second aspect of the present disclosure, wherein the lattice-shaped discharge groove is formed on a surface of the thrust bearing or the thrust race, and the planar protrusions of a square shape has corner parts being formed at positions adjacent to the discharge groove.

Also, according to the fourth aspect of the present disclosure, there is provided the sliding member according to the second aspect of the present disclosure, wherein a plurality of straight grooves extend in a radial direction being formed on a surface of the thrust bearing or the thrust race, at least one annular groove that intersects the straight grooves is formed, the discharge groove is constituted by the plurality of straight grooves and the annular groove, and the planar protrusions is formed at positions adjacent to the discharge groove.

Also, according to the fifth aspect of the present disclosure, there is provided the sliding member according to the second aspect of the present disclosure, wherein a V-shaped groove in which an end on an outer side is open at an outer circumferential part and an end on an inner side is open at an inner circumferential part is formed at a plurality of locations of a surface of the thrust bearing or the thrust race in a circumferential direction, the discharge groove is constituted by the plurality of V-shaped grooves, and the planar protrusions is formed at positions adjacent to the V-shaped grooves.

Furthermore, according to the sixth aspect of the present disclosure, there is provided a method for manufacturing the sliding member according to any of the first to fifth aspects of the present disclosure, the method including: forming a lattice-shaped discharge groove or a discharge groove of a shape having a corner part on a surface of a base material, and thereafter forming a resin coating at a uniform thickness over an entire surface area of the base material to form the discharge groove and planar protrusions.

Also, according to the seventh aspect of the present disclosure, there is provided a method for manufacturing the sliding member according to any of the first to fifth aspects of the present disclosure, the method including: forming a resin coating to a flat surface of a base material by screen printing, and forming the discharge grooves and the plurality of planar protrusions with only the resin coating, wherein a bottom of the discharge groove consists of an exposed surface of the base material.

Also, according to, the eighth aspect of the present disclosure there is provided a method for manufacturing the sliding member according to any of the first to fifth aspects of the present disclosure, the method including: applying a resin coating to a flat surface of a base material, forming the discharge groove to span the resin coating itself or the resin coating and an inner part of the base material, and forming the planar protrusions.

Effects of Invention

According to such configurations, because the sliding surface is constituted by resin-coated planar protrusions, contact resistance between the sliding surface and the counterpart member can be reduced, and power loss due to the sliding member coming in contact with the counterpart member can thereby be reduced. Also, because contaminants that infiltrate between the sliding surface and the counterpart member can be discharged outside of the sliding surface by the discharge groove, contaminants can be prevented from digging into the sliding surface. Accordingly, a sliding member that is long lasting and enables power loss to be reduced can be provided.

DESCRIPTION OF EMBODIMENTS

Hereinafter, when describing the present invention with regard to illustrated embodiments, reference numeral 1 in FIGS. 1 to 4 denotes the thrust bearing of a scroll compressor. As also known from JP 4511412B, JP 4737141B, and JP 3364016B, the scroll compressor is provided with intermediate housing 2 with respect to which the inside of the cylindrical casing is divided into one end and the other end in the axial direction. Back surface 1A of thrust bearing 1 is fixed to end face 2A of intermediate housing 2 on the swirl vane 3 side.

Back surface 4B of annular thrust race 4 is fixed to back surface 3A of swirl vane 3, and end face 4A (sliding surface) of thrust race 4 approaches or contacts sliding surface 1B of thrust bearing 1.

Figure 3:
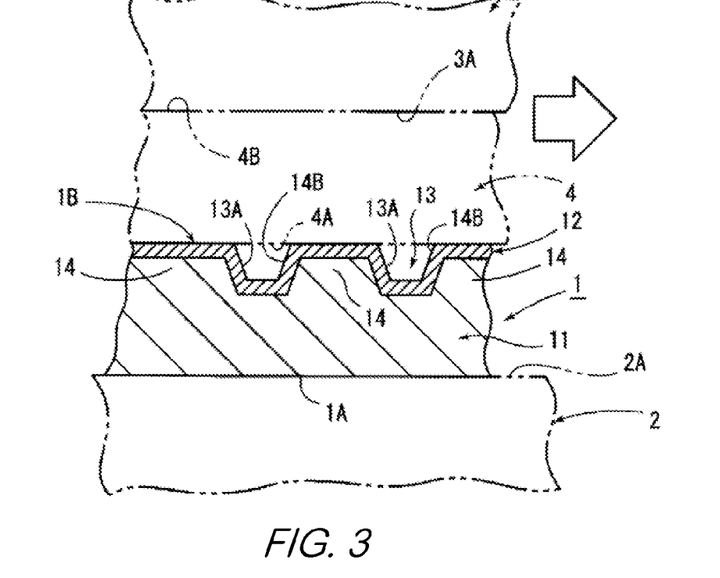
FIG. 3 is a cross-sectional view of the main part along line III-III in FIG. 1.
Figure 4:
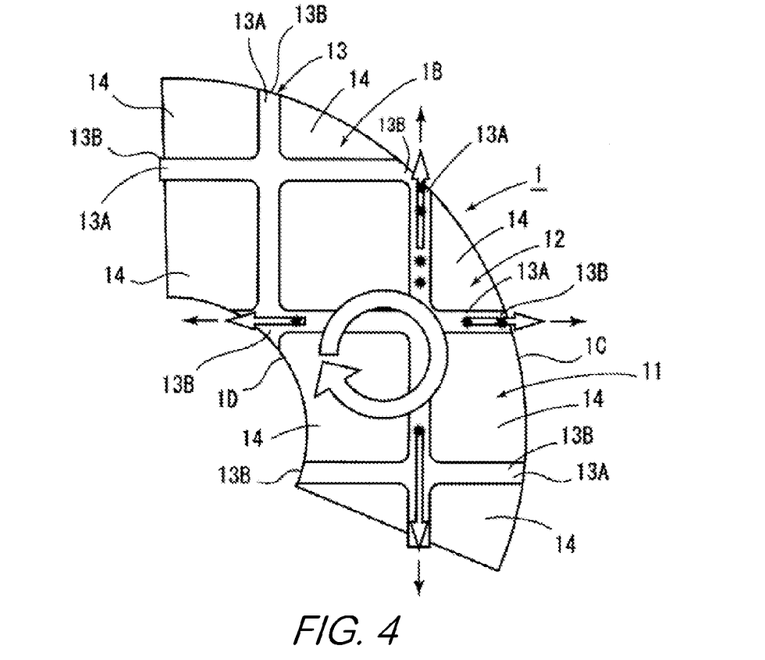
FIG. 4 is an enlarged view of the main part in FIG. 1.

As illustrated by the thick white arrow in FIG. 4, when swirl vane 3 and thrust race 4 swing on a rotation axis which is not shown in the figures, a force in the axial direction (downward force in FIG. 3) acts on swirl vane 3, causing end face 4A (sliding surface) of thrust race 4 that swings in tandem with swirl vane 3 and sliding surface 1B of thrust bearing 1 which is the fixed side to slide.

As shown with the cross-sectional view in FIG. 3, thrust bearing 1 of the present embodiment is constituted by base material 11 that is annularly formed as a whole at a predetermined thickness, and a resin coating 12 applied to the surface (surface opposing thrust race 4) of base material 11.

Thrust bearing 1 to which resin coating 12 has thus been applied has lattice-shaped discharge groove 13 formed over its entire surface. This lattice-shaped discharge groove 13 is constituted by a large number of straight grooves 13A formed at the same pitch horizontally and vertically. The depth, width and cross-sectional shape of straight grooves 13A are set to be the same throughout. Also, one end 13B of each straight groove 13A in the longitudinal direction is open at an outer circumferential part 1C or an inner circumferential part 1D of thrust bearing 1.

The inner space of lattice-shaped discharge groove 13 serves as a discharge channel for discharging contaminants 16 such as wear particles, and furthermore serves as a lubricating oil channel through which lubricating oil circulates.

In thrust bearing 1 of the present embodiment, a large number of planar protrusions 14 of a square shape having corner parts are formed as a result of lattice-shaped discharge groove 13 being formed. Each corner part 14A of planar protrusions 14 is chamfered to a rounded shape. In other words, corner parts 14A forming the intersections of vertical and horizontal straight grooves 13A are all chamfered to a rounded shape (see FIG. 2). Also, as shown in FIG. 3, each straight side 14B between one corner part 14A and an adjoining corner part 14A is formed as a sloping surface that slopes 15 to 90 degrees relative to the flat bottom of the straight grooves 13A. In other words, the corner parts 14A and the straight grooves 13A have an inverted trapezoidal cross-sectional shape in which the open side is wider than the bottom.

Note that radius R at the time of chamfering each corner part 14A to a rounded shape is set to be greater than 0.2 mm, and length L of one side 14B is set to be greater than 1.0 mm.

Thrust bearing 1 of the present embodiment having a configuration such as described above is manufactured through manufacturing processes such as the following.

That is, first, annular base material 11 provided with a predetermined thickness is manufactured. An iron-based material, an aluminum-based material or a copper-based material, for example, is used as the material of base material 11. Next, vertical and horizontal straight grooves 13A of the same depth are formed by a cutting process at a predetermined pitch over the entire surface (end face on the thrust race side 4 side) area of base material 11, as a result of which lattice-shaped discharge groove 13 and a large number of planar protrusions 14 at adjacent positions thereto are formed on the surface of base material 11. At the time of the cutting process, each corner part 14A of planar protrusions 14 is chamfered to a rounded shape as mentioned above.

Resin coating 12 is thereafter applied at the same thickness over the entire surface area of base material 11 on which the lattice-shaped discharge groove 13 and the large number of planar protrusions 14 are formed (see FIG. 3). Materials and manufacturing processes such as the following can be used to form resin coating 12. That is, as resin coating 12, hard particles can be mixed with a solid lubricant, using a thermosetting resin as a binder. As the solid lubricant, $MoS_2$, PTFE, Gr, $WS_2$, h-BN, CF, a fluorine-based resin or the like can be used, and one or more of these materials can be mixed. Also, as hard particles, an oxide (alumina, silica), a nitride (SiN), a carbide (SiC), a sulfide (ZnS) or the like can be used, and one or more of these materials can be mixed. Furthermore, as the thermosetting resin used as a binder, PI, PAI or the like can be used, and one or more of these materials can be mixed. Note that the hard particles may be omitted if necessary, and a composition of only a thermosetting resin and a solid lubricant may be used. Furthermore, as the process for manufacturing the resin coating, roll coating, spray coating, spin coating, or pad printing can be used.

Also, although lattice-shaped discharge groove 13 and planar protrusions 14 of thrust bearing 1 are formed, as mentioned above, by cutting vertical and horizontal straight grooves in the surface of base material 11, and thereafter applying resin coating 12, lattice-shaped discharge groove 13 and planar protrusions 14 can be formed as follows other than by a cutting process. That is, lattice-shaped discharge groove 13 may be formed on the surface of base material 11 by an etching process or a pressing process instead of a cutting process, and resin coating 12 of the same thickness may thereafter be applied to the surface of base material 11 similarly to the aforementioned embodiment.

Figure 6:
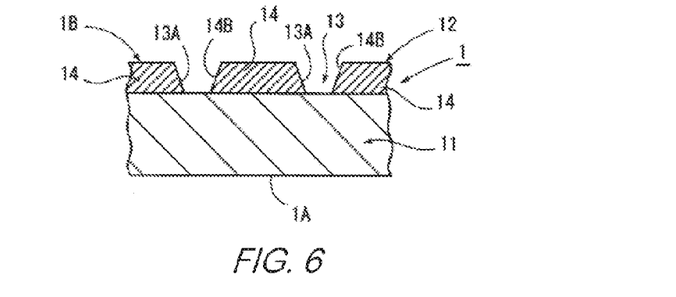
FIG. 6 is a cross-sectional view of a main part showing an embodiment of the present invention.

Also, as shown in FIG. 6, resin coating 12 is formed on the flat surface (upper surface) of base material 11 by screen printing or the like at the same thickness as the depth of lattice-shaped discharge groove 13. By forming this resin coating 12, planar protrusions 14 are also formed at the same time as lattice-shaped discharge groove 13 is formed. Also, each corner part 14A of planar protrusions 14 is also chamfered to a rounded shape. In the present embodiment, a configuration is adopted in which the surface of base material 11 is exposed as the bottom of lattice-shaped discharge groove 13.

Figure 7:
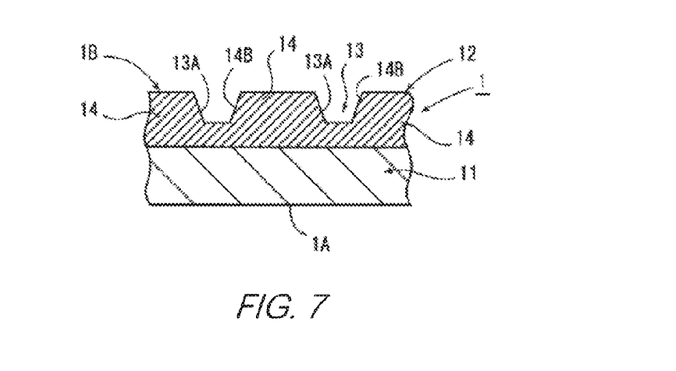
FIG. 7 is a cross-sectional view of a main part showing an embodiment of the present invention.

Also, as shown in FIG. 7, resin coating 12 may be formed over the entire flat surface area of base material 11 by screen printing or the like at a thickness greater than the depth of lattice-shaped discharge groove 13, and lattice-shaped discharge groove 13 and planar protrusions 14 may be formed therewith. In the embodiment in FIG. 7, resin coating 12 is formed to include the bottom of lattice-shaped discharge groove 13. In other words, a configuration is adopted in which the surface of base material 11 is not exposed.

Figure 8:
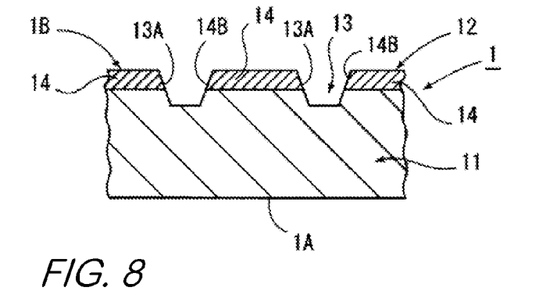
FIG. 8 is a cross-sectional view of a main part showing an embodiment of the present invention.

Furthermore, as shown in FIG. 8, resin coating 12 may be screen printed at the same thickness over the entire flat surface area of base material 11, and thereafter lattice-shaped discharge groove 13 may be formed by a cutting process so as to cut through resin coating 12 to an inner part below the surface of base material 11. In this embodiment, base material 11 will be exposed as the bottom of lattice-shaped discharge groove 13. Thrust bearing 1 can be manufactured by manufacturing processes such as the above.

With thrust bearing 1 of the present embodiment having the abovementioned configuration, the following actions and effects can be obtained. That is, because thrust bearing 1 is provided with lattice-shaped discharge groove 13, lubricating oil circulates via discharge groove 13 serving as a lubricating oil channel, and is quickly supplied to sliding surface 1B in a uniform manner. Thus, a film of oil is quickly formed on sliding surface 1B.

Also, because sliding surface 1B is formed by the surface of planar protrusions 14 which consists of resin coating 12, the contact resistance of sliding surface 1B at the time of sliding with respect to end face 4A of thrust race 4 can be reduced. Also, sliding surface 1B has good lubricating oil retention. Thus, contact resistance and slide resistance when thrust race 4 comes in contact with thrust bearing 1 can be reduced. Power loss in scroll compressors can thereby be reduced, consequently enabling the fuel efficiency of motor vehicles to be improved.

Figure 1:
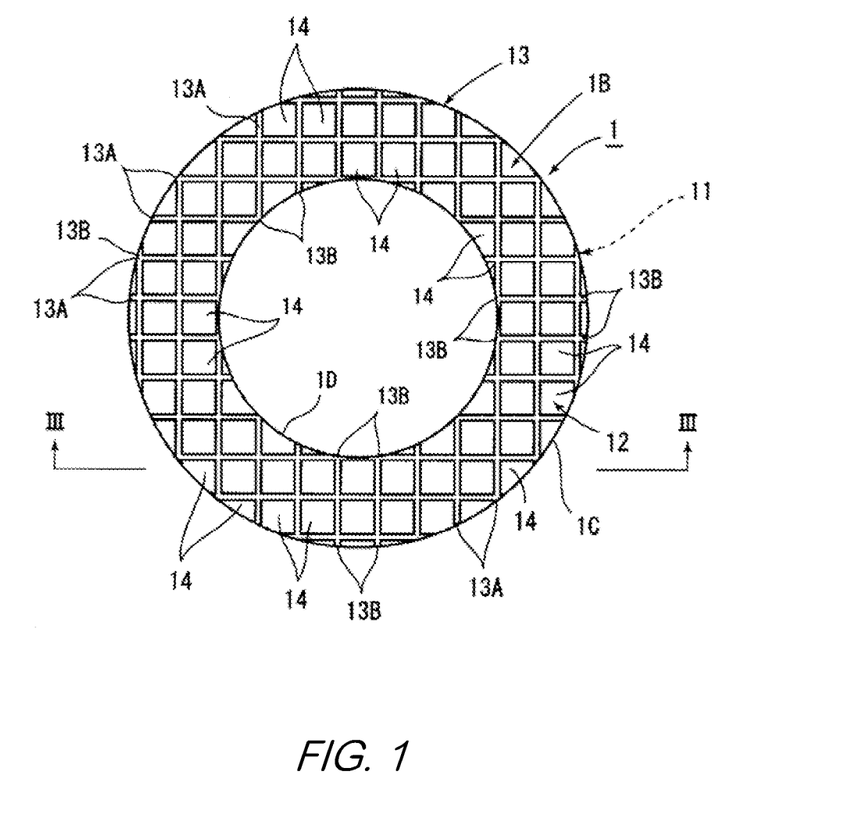
FIG. 1 is a plan view showing an embodiment of the present invention.
Figure 2:
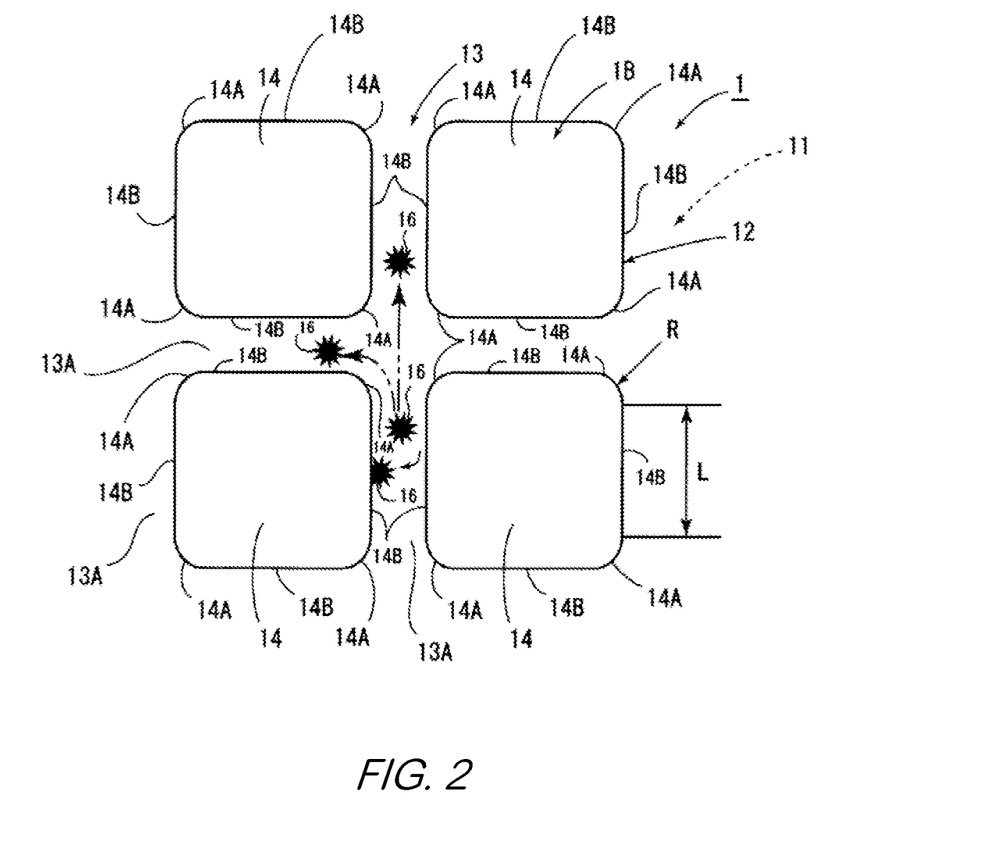
FIG. 2 is an enlarged view of a main part of FIG. 1.

Furthermore, because lattice-shaped discharge groove 13 exists in the surface of thrust bearing 1, in the case where minute contaminants 16 such as wear particles infiltrate onto sliding surface 1B, as shown in FIG. 2, these contaminants fall into lattice-shaped discharge groove 13 and are discharged outside of sliding surface 1B from inner circumferential part 1D or outer circumferential part 1C. More specifically, as shown in FIG. 4, swirl vane 3 and thrust race 4 swing circularly so as to obliquely intersect vertical and horizontal straight grooves 13A of discharge groove 13. Thus, contaminants 16 such as wear particles fall into lattice-shaped discharge groove 13 with the swinging of thrust race 4, and are thereafter moved through the grooves towards inner circumferential part 1D or outer circumferential part 1C. Here, because the corner parts 14A constituting the intersections of straight grooves 13A are all chamfered to a rounded shape, contaminants 16 such as wear particles do not get caught on the corner parts 14A and accumulate (see FIG. 2). Moreover, contaminants 16 that have partially entered lattice-shaped discharge groove 13 with the swinging of thrust race 4 will be worn down by sides 14B which are straight and end face 4A of thrust race 4 which moves such that the intersection with sides 14B is relatively displaced. In other words, contaminants 16 such as wear particles are fragmented into smaller particles by the edges of sides 14B of planar protrusions 14, and the fragmented contaminants 16 fall into discharge groove 13 and are discharged from inner circumferential part 1D or outer circumferential part 1C. Accordingly, with thrust shaft 1 of the present embodiment, contaminants 16 such as wear particles can be favorably prevented from digging into sliding surface 1B which is constituted by the surfaces of planar protrusions 14. Thus, a long-lasting thrust bearing 1 can be provided.

Figure 5:
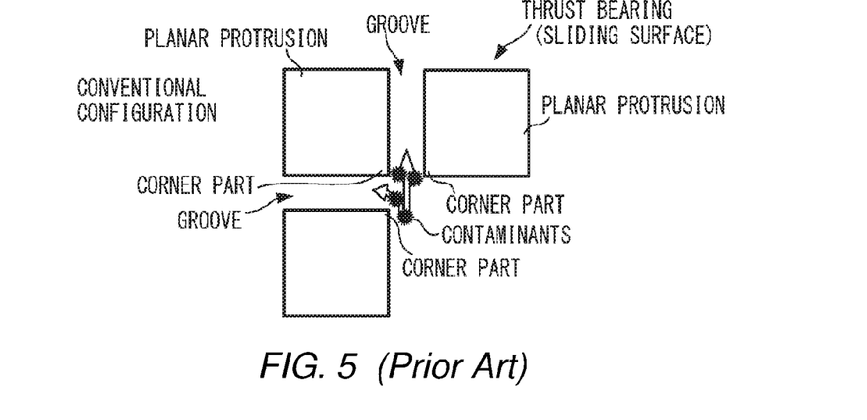
FIG. 5 is a plan view showing a main part of a conventional configuration.

In contrast to embodiments such as described above, with a conventional configuration shown in FIG. 5 (e.g., FIG. 5 of JP 4511412B), an annular groove and a plurality of straight grooves are formed on the surface of the thrust bearing, but the corner parts forming the intersections of the grooves are right-angled. Thus, with the conventional configuration, it has been pointed out that contaminants such as wear particles tend to accumulate at the positions of the corner parts of the intersections, and contaminants that have thus accumulated eventually dig into the sliding surface, causing the sliding surface to be damaged.

Next, although, in the abovementioned embodiment, lattice-shaped discharge groove 13 is formed on the surface of thrust bearing 1, a groove of a shape having corner parts that is other than lattice shaped may be formed on the surface of thrust bearing 1 and used as discharge groove 13. That is, in FIG. 9, straight grooves 13A extending in the radial direction every 45 degrees in the circumferential direction are formed on the surface of thrust bearing 1, and one annular groove 13C is formed so as to so intersect the straight grooves 13A. Discharge groove 13 is constituted by straight grooves 13A and annular groove 13C. The remaining configuration is the same as the first embodiment shown in FIGS. 1 to 4. In the embodiment shown in FIG. 9, ends 13B of straight grooves 13A are open at inner circumferential part 1D or outer circumferential part 1C. A plurality of fan-shaped planar protrusions 14 are formed next to discharge groove 13, and the surfaces thereof constitute sliding surface 1B. Also, corner parts 14A positioned at the intersections of annular groove 13C and straight grooves 13A are all chamfered to a rounded shape, similarly to the above embodiment. The remaining configuration is the same as the first embodiment, and members corresponding to the first embodiment are given the same member numerals.

Figure 10:
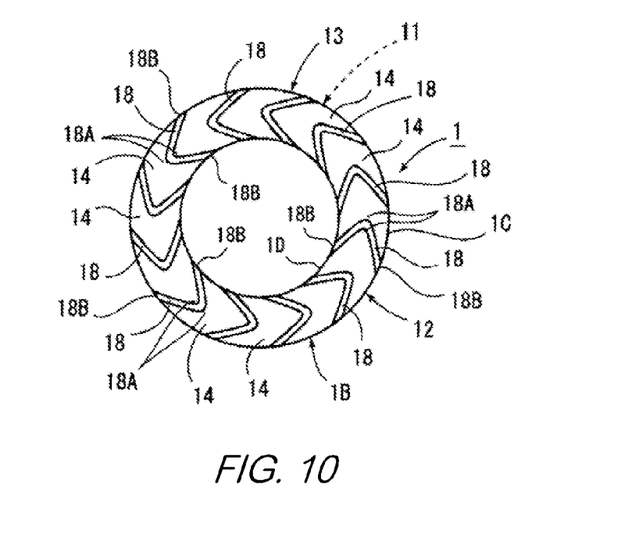
FIG. 10 is a plan view showing another embodiment of the present invention.

Also, in FIG. 10, V-shaped grooves 18 in which ends 18B are open at inner circumferential part 1D or outer circumferential part 1C are formed on the surface of thrust bearing 1 at regular intervals in the circumferential direction. Discharge groove 13 is constituted by these V-shaped grooves 18. Also, adjacent parts of adjoining V-shaped grooves 18 serves as planar protrusions 14, and surfaces thereof constitute sliding surface 1B. Corner parts 18A where V-shaped grooves 18 bend in the middle (the corner parts of opposing parts) are chamfered to a rounded shape. The remaining configuration is the same as the first embodiment.

Figure 9:
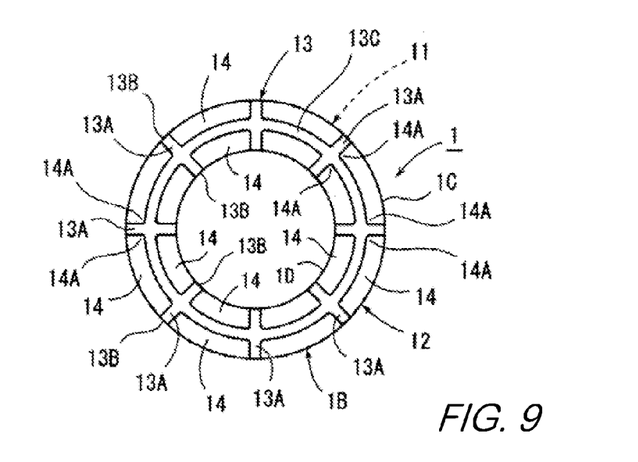
FIG. 9 is a plan view showing an embodiment of the present invention.

The same actions and effects as the first embodiment can be obtained, even with thrust bearing 1 provided with discharge groove 13 of a shape having corner parts such as shown in FIGS. 9 and 10.

Note that although, in the above embodiments, resin coating 12 is applied to the surface of base material 11 and discharge groove 13 and planar protrusions 14 are formed, an intermediate layer may be formed between base material 11 and resin coating 12. In other words, a configuration may be adopted in which an intermediate layer is formed on the surface of base material 11, resin coating 12 is applied to the surface of the intermediate layer, and the abovementioned discharge groove 13 and planar protrusions 14 are then formed. As the intermediate layer in this case, a sintered copper layer, a sprayed copper layer, or a sprayed copper-aluminum layer can be employed.

Also, although the case where the present invention is applied to thrust bearing 1 which is fixed to intermediate housing 2 was described in the abovementioned embodiments, the present invention can also be applied to end face 4A of thrust race 4 which serves as the counterpart member. Furthermore, the present invention may also be applied to end face 2A of intermediate housing 2 in a configuration that omits thrust bearing 1. In this case, end face 2A serves as the base material, and resin coating 12 is applied thereto. Alternatively, the present invention may be applied to back surface 3A of swirl vane 3 in a configuration that omits thrust race 4. In this case, back surface 3A of swirl vane 3 serves as the base material, and resin coating 12 is applied thereto.

It is also possible to apply the present invention to the swash plate of a swash plate compressor.

The invention claimed is:

1. A sliding member comprising:
   a base material having a surface on which a sliding surface that slides against a counterpart member is formed; and
   a resin coating formed on the surface of the base material, wherein the resin coating includes:
      a first discharge groove that is formed on the sliding surface and extends in a first direction,
      a second discharge groove that is formed on the sliding surface and extends in a second direction which is different from the first direction, and
      a plurality of planar protrusions that are areas along the sliding surface other than the first and second discharge grooves, and that have corners where the first discharge groove and the second discharge groove meet with each other as viewed from a normal direction of the sliding surface,
   wherein the corners of the planar protrusions are rounded as viewed from the normal direction of the sliding surface.

2. The sliding member according to claim 1, wherein
   the first and second discharge grooves form a lattice-shape as viewed from the normal direction of the sliding surface, and
   each of the planar protrusions has a square shape with the rounded corners as viewed from the normal direction of the sliding surface.

3. The sliding member according to claim 1, wherein
   the first and second discharge grooves include:
      a plurality of straight grooves extending in a radial direction as viewed from the normal direction of the sliding surface, and
      at least one annular groove that intersects the straight grooves.

4. The sliding member according to claim 1, wherein
   the first and second discharge grooves include a V-shaped groove in which an end on an outer side is open at an outer circumferential part and an end on an inner side is open at an inner circumferential part, as viewed from the normal direction of the sliding surface.

5. The sliding member according to claim 1, wherein
   the planar protrusions have a wider area than that of the first and second discharge grooves.

6. The sliding member according to claim 1, wherein
   the sliding member is a thrust bearing of a scroll compressor or a thrust race that slides with respect to the thrust bearing, and
   the first and second discharge grooves further function as a lubricating oil channel through which lubricating oil circulates.

7. The sliding member according to claim 1, wherein
   the first and second discharge grooves are formed on the surface of the base material, and
   the resin coating has a uniform thickness over an entire surface of the base material.

8. The sliding member according to claim 1, wherein
   the surface of the base material is flat, and
   the first and second discharge grooves are only formed in the resin coating.

9. The sliding member according to claim 1, wherein the first and second discharge grooves penetrate the resin coating to reach an inner part of the base material.

10. The sliding member according to claim 1, wherein the planar protrusions have straight sides as viewed from the normal direction of the sliding surface.

11. A method of manufacturing a sliding member comprising:

applying a resin coating to a surface of a base material;

forming a first discharge groove in the resin coating, the first discharge groove extending in a first direction; and forming a second discharge groove in the resin coating, the second discharge groove extending in a second direction which is different from the first direction;

wherein the first and second discharge grooves form a plurality of planar protrusions that are areas along the surface other than the first and second discharge grooves and that have corners where the first discharge groove and the second discharge groove meet with each other as viewed from a normal direction of the surface, and wherein the corners of the planar protrusions are rounded as viewed from the normal direction of the surface.

* * * * *